United States Patent [19]

Kobayashi

[11] 4,353,222

[45] Oct. 12, 1982

[54] VACUUM APPARATUS

[75] Inventor: Masakazu Kobayashi, Tokyo, Japan

[73] Assignee: Kyowa Vacuum Engineering, Ltd., Tokyo, Japan

[21] Appl. No.: 164,031

[22] Filed: Jun. 30, 1980

[30] Foreign Application Priority Data

Jul. 4, 1979 [JP] Japan .................. 54-85262
Feb. 23, 1980 [JP] Japan .................. 55-21871

[51] Int. Cl.³ .......................................... F25B 19/00
[52] U.S. Cl. ...................................... 62/268; 62/275; 62/434; 62/519
[58] Field of Search ............... 62/430, 434, 438, 268, 62/100, 515, 519, 275

[56] References Cited

U.S. PATENT DOCUMENTS 2,702,992  3/1955  Mooser ................................ 62/438
3,012,408 12/1961  Perkins et al. ..................... 62/430

Primary Examiner—Ronald C. Capossela
Attorney, Agent, or Firm—Watts, Hoffmann, Fisher & Heinke Co.

[57] ABSTRACT

In this vacuum apparatus with a vacuum chamber and a vapor condenser installed therein, a refrigerant and a brine are supplied into said vapor condenser to thereby effect heat exchanges between both mediums and between both or either one of said mediums and a vapor to be generated.

8 Claims, 9 Drawing Figures

VACUUM APPARATUS

BACKGROUND OF THE INVENTION

This invention relates to a vacuum apparatus which is of service to the purposes such as drying (inclusive of freeze drying), concentration, distillation, cooling desolventing and the like in the food preservation and other fine chemistry fields.

This invention, as mentioned above, can be used for various purposes. As the exemplary instance of its use there can be enumerated a vacuum apparatus for use in freeze drying. Therefore, explanation will be made with reference to it hereinafter. However, it is to be understood it goes without saying that this invention should not be limited to this alone.

FIGS. 1 and 2 illustrate the examplary prior art embodiments of the aforesaid vacuum apparatus for use in freeze drying. First, explanation will be made as to these embodiments. In this connection, it is to be noted that like reference numerals will be attached to the parts common to both embodiments.

In these conventional apparatuses, as is generally known, there are carried out a first step for cooling the material being dried accommodated in the one vacuum chamber and freezing and a second step for condensing the water vapor and/or other solvent vapor (which shall be referred to as vapor) to be generated from the material being dried by means of the condenser installed in the other vacuum chamber and recovering. In this case, since a large quantity of vapor is treated by the condenser in the former stage of the second step, a load is almost taken off the condenser in the latter stage thereof.

The vacuum apparatus illustrated in FIG. 1 is arranged to cool the vapor present outside of a condenser 10 by virtue of the heat of evaporation of a refrigerant comprising halocarbon, etc. supplied from a refrigeration unit 11 into said condenser 10, thereby condensing said cooled vapor on the condenser 10.

Reference will be made to the practice of drying operation using this apparatus. In the first step, the material being dried is first put on a plurality of cooling and heating shelves 5 installed in a first vacuum chamber or on a supporting means (not shown) disposed therebetween, and then a valve 3 disposed in a duct 6 is closed. Hereat, a valve 13 is opened which is disposed in a first refrigerant pipe line 15 extending from a first refrigeration unit 11 (which is a usual one including a compressor, an oil separator, a condenser and an intercooler in the case of two-stage compression unit, and is also inclusive of the case where it is used in two-stage cascade refrigeration unit), simultaneously a valve 14 disposed in a second refrigerant pipe line 16 is closed, and then the refrigeration unit is put into operation.

Consequently, the refrigerant in the first refrigerant pipe line 15 passes through an expansion valve 17 and circulates in the pipe line 15 as indicated with a piece dotted line arrow to thereby cool the brine or heat carrier in a heat exchanger 7. The thus cooled brine is allowed to circulate in a brine pipe line 18 as indicated with a solid line arrow by virtue of a pump 9, thereby cooling the shelves 5. If needed at this time, it may be possible to put a second refrigeration unit 12 in operation so as to cool the brine in a second heat exchanger 8. In this connection, it is to be noted that reference numeral 21 in the brine pipe line 18 denotes a heater.

The shelves 5 are thus cooled and the material being dried is cooled from the room temperature up to a temperature in the range of from $-45°$ C. to $-50°$ C. for freezing purposes, thereby finishing the first step.

Subsequently, the switchover of the first step to a second step takes place. Prior to this, the valve 13 is closed and the valve 14 is opened for the purpose of stopping the flow of refrigerant in the pipe line 15 and starting the flow thereof in the pipe line 16 as indicated with a two piece dotted line arrow, thereby cooling the vapor condenser 10 up to a temperature in the range of from $-50°$ C. to $-55°$ C. In this connection, it is to be noted that reference numeral 20 in the pipe line 16 denotes an expansion valve.

Hereat, the second step is started through such a manner that the flow of refrigerant in the pipe line 16 is continued while the valve 3 is opened simultaneously with the drive of a vacuum pump 4. The pressures in both vacuum chambers 1 and 2 are thus reduced up to between 0.2 mmHg and 0.02 mmHg.

On the other hand, the temperature of shelves 5 is raised to a suitable temperature by turning the heater 21 on and driving the pump 9, said suitable temperature being different depending on the properties of materials being dried, thereby evaporating the water or other solvent contained in the material being dried, during which the sublimation heat deprived for maintaining the temperature of shelves at a suitable temperature is compensated by means of the heater 21. In case where said suitable temperature is lower than the room temperature it sometimes happens that the sum of the energy of pump 9 necessary for circulating the brine and the heat entering from the outside of the vacuum chamber is over said sublimation heat. It is the refrigeration unit 12 that is utilized at this time for the purpose of cancelling the surplus heat and holding the shelves 5 at a desired temperature.

However, the vacuum apparatus as illustrated in FIG. 1 is perceived to involve four defects as mentioned below:

The first defect consists in that since in the second step of this apparatus the load changes in the refrigerating cycle are so large extending from the high load state in the initial stage of drying where a large quantity of vapor is condensed to the low load state of the succeeding stage of drying and further to the almost no-load state in the final stage of drying, namely the highest load amounts of a several—ten times as large as the lowest load which is in excess of the normal regulation range of means for use in the refrigerating cycle, for instance, such as a thermostatic expansion valve, it is difficult to maintain the refrigerating cycle in the optimum state automatically coping with said load changes, and further that the second step, wherein a condensation temperature of about $-60°$ C. is called for at the time of high load, is liable to accidents or troubles such as hardening of lubricating oil owing to excessive cooling in excess of the allowable limit of the refrigerating cycle taking place in the latter stage, deterioration of the lubricating oil owing to excessive heating of the gas discharged from the refrigeration unit caused by excessive compression ratio, blocking owing to over-closing of the thermostatic expansion valve, wet compression owing to over-opening of said expansion valve and the like.

As is evident from the foregoing, this vacuum apparatus involves various difficulties in achieving necessary controls for avoiding the above mentioned accidents or troubles and is unable to control the temperature of the condenser 10 to a predetermined valve accurately against said variable loads and thereby accurately control the vapor pressure which is a factor exerting influence on the quality and treating time of the material being dried.

And, the above mentioned difficulties are further increased under following circumstances.

In the vapor condenser 10 being less than 0° C. the water vapor is condensed into ice which sticks fast to the condensing portions and constitutes ice build-up. Accordingly, when the water vapor is condensed un-uniformly on the condensing surface, the thickness of ice increases only at the uniformly condensed portions, which is liable to become bottle-neck or cause blocking of the vapor passageway. In the case of a dry expansion type evaporator, meantime, it is necessary that the total refrigerant should almost be vaporized into a suitable superheated gas at the outlet. In this apparatus, however, as seen from the foregoing, the capability and capacity of the condenser naturally deteriorate because the heat transfer between refrigerant and evaporator surface is made worse at the predominant portions of the evaporator surface and consequently the evaporation surface does not act as an effective condensing surface. To cope with this, it is necessary to consider a countermeasure for preventing wet compression by separating or evaporating a part of the refrigerant passing in the liquid form through the condenser on the way of the suction line. However, this countermeasure beings about not only the loss of refrigeration capability but also the necessity of extremely minute control of expansion valves against very wide load variations, thereby increasing the burden of an operator.

In this apparatus, further, a sudden switchover of refrigerant from the heat exchanger 7 to the condenser 10 takes place at the time of switchover of the first step to the second step and consequently the load of the refrigeration unit 11 rapidly changes from a small load of −45° C. through −50° C. at once to a large one covering the temperature range of from the room temperature (temperature of condenser 10) to freezing temperature. In addition, the condenser 10 must be cooled to a temperature of −50° C. through −55° C. in 20 minutes or as before the temperature of shelves 5, which are out of cooling action, is raised up by the heat entering from the outside. Accordingly, this rapid load variations thus caused in the refrigerating cycle are liable to bring about various troubles or accidents.

Still further, the above mentioned switchover operation is unreasonable from the economical viewpoint of energy. At the terminal of the first step where the shelves have been cooled to a temperature of −45° C. through −50° C., the heat exchanger 7 is already prepared for a lower temperature which is substantially necessary for the condenser 10. Nevertheless, this switchover operation is observed to incur double losses such that the thus cooled heat exchanger 7 must be heated by means of the heater 21 from necessity of raising the temperature of shelves 5 in the second step which should be said a surplus burden and on the other hand another non-cooled condenser 10 must be cooled rapidly by means of the refrigeration unit 11. Additionally, there is caused a necessity of using the vacuum pump 4 of very high evacuation capacity, for instance, such as less than 10-20 minutes during which the rising of temperature of the material being dried on the shelves 5 which are already out of cooling action can be prevented and thus attaining a pressure sufficient to rapidly prevent the material being dried from melting.

In addition thereto, the second step of this apparatus, as previously mentioned, can not dispense with the heat exchanger 8 and refrigeration unit 12 from necessity of controlling the temperature of the shelves 5. In order to comply with this requirement, this apparatus is in need of an expensive installation cost and an increased installation area.

It is the vacuum apparatus illustrated in FIG. 2 that has been proposed for the purpose of eliminating various defects inherent in the vacuum apparatus illustrated in FIG. 1. This apparatus is a vacuum apparatus which is designed to circulate through the inside of the condenser 22 the brine cooled by the refrigerant in the heat exchanger 7 and condense the vapor on the surface of the condenser 22.

Hereinafter, this apparatus will be explained mainly with reference to the points different from the apparatus illustrated in FIG. 1 while omitting the explanations on the portions common to both apparatuses.

In order that the shelves 5 may be cooled, valves 23 and 24 are opened, a valve 25 is closed and a refrigeration unit 11 is operated thereby to circulate the brine through a first brine pipe line 26 in the direction of a piece solid line arrow. Thus, the first step terminates at the time when the material being dried has been cooled to a predetermined temperature and frozen.

Successively, prior to the switchover to the second step, valves 25 and 27 are opened, valves 23 and 24 are closed and a pump 28 is driven for circulating the brine through a second brine pipe line 29 in the direction of two piece solid arrow, thereby cooling the vapor condenser 22 to a predetermined temperature.

Then, the vacuum pump 4 is put into operation and the valve 3 is opened so as to practice the second process.

Then, a valve 36 is opened and the pump 9 is driven for circulating another brine into the shelves 5 and the heater 21 through a part of pipe-line 32 and pipe 34 in the direction of the three piece solid arrow. And, when the shelves 5 are allowed to have a suitable temperature by means of the heater 21 after the vacuum chamber 1 has reached a predetermined degree of vacuum, the water vapor (and/or other solvents) in the material being dried is sublimited by the heat of shelves 5 and the resulting vapor is condensed by the vapor condenser 31 and trapped. The first step is thus transferred to the second step.

In order to control the temperature of the shelves 5 at a comparatively low temperature herein, if needed to cool the shelves, there may be employed an automatic control of valves, for instance, such that valves 23 and 24 are opened slightly and further the valve 25 is closed slightly in response to temperature signals, whereby the shelves 5 may be cooled by using a brine obtained by properly mixing the brine of an elevated temperature circulating through the shelves 5 and pump 9 with the brine of a lower temperature circulating through the condenser 22 and pump 28. This can dispense with the heat exchanger 8 and refrigeration unit 12 employed in the apparatus illustrated in FIG. 1.

According to this vacuum apparatus, furthermore, it becomes possible to bring about moderate changes in load as well as control the temperature of condenser 22 to a desired valve in the manner of applying a load into the brine circulation line for the purpose of moderating the excessive low load.

As is evident from the aforegoing, this apparatus surely can facilitate the maintenance of the optimum conditions for the refrigerating cycle and accordingly can reduce the occurrence of aforesaid troubles or accidents in the refrigerating cycle. On the other hand, however, this apparatus is defective in that even when the operation of the refrigeration unit is in order and the heat exchanger 7 is cooled sufficiently, if the troubles take place in respect of the valves or the like of the pump 28 or brine pipe line 29 resulting in stoppage of flow of brine in the condenser 22 or decrease in the flow rate of brine, in a moment the temperature of the condenser 22 rises, the vacuum pressure rises, whereby the material being dried melts in a short time and the intended freeze drying fails.

Still further, this apparatus is defective in that it is utilized in a considerable degree for such applications as condenser temperature in the vicinity of 0° C., but a little for the temperature ranging between −50° C. and −60° C. The reason is that due to the presence of two kinds of refrigeration capability losses to be referred to hereinafter which call for an excessively large-sized refrigeration apparatus and a compelled excessive energy consumption, this apparatus should be said unprofitable economically.

The first refrigeration capability loss is a temperature loss resulting from the heat transfer induced twice between the outer surface of the refrigerant evaporator of the heat exchanger 7 and the inner surface of the vapor condenser 22 by the brine. Accordingly, in order that this vacuum apparatus may obtain the condenser temperature identical with that of the apparatus illustrated in FIG. 1, it is necessary that the evaporation temperature should be lower by 6° C.-8° C. corresponding to said temperature loss. When explaining this taking the case of a two-stage compression refrigeration apparatus, in case where the evaporation temperature is −60° C. and the evaporation temperature is further lowered by 6° C.-8° C., the refrigeration capability is deteriorated into about 70% and accordingly this induces the necessity of installing an about 40% larger scaled plant. And, in order to obtain the same degree of refrigeration capability there is a necessity of increasing the energy for that purpose by about 30%.

The second refrigeration capability loss is caused by a pump 28 for circulating the brine from the heat exchanger 7 into the condenser 22. The refrigeration capability of refrigerant comes from an evaporative heat. So refrigerant has a large refrigeration capability per Kg. In contrast, since the refrigeration capability of brine comes from a sensible heat, brine has a small refrigeration capability per Kg, i.e. one over several tense of that of refrigerant, the condenser 22, whose temperature is required to be uniform, is in need of a pump having a large flow rate and therefore amount of energy for brine circulation is increased, for instance, several ten percent of the net refrigeration capability to be transmitted will thereby be lost.

Still further, this apparatus is defective in that the temperatures of each of the condenser 22 and heat exchanger 7 at the time of switchover of the brine flow from the pipe line 26 to the pipe line 29 after completion of the first step is the temperature of a mixture of brines in both pipe lines (−25° C. through −30° C.) which brings about rapid changes in the load and vapor temperature in the refrigeration unit 11 and that since the heat capacities of both the condenser 22 and heat exchanger 7 are large, it is extremely difficult to cool them up to a temperature of about −50° C. through −55° C. in a short time of about 20 minutes.

SUMMARY OF THE INVENTION

It is an object of this invention to provide a vacuum apparatus capable of eliminating the drawbacks inherent in the above mentioned conventional apparatuses.

It is another object of this invention to provide a vacuum apparatus capable of realizing the operational stability and easiness of refrigeration units for cooling condensing means as well as achieving accurate control of the vacuum pressure in the manner of controlling the condensing means temperature accurately without employing excessive-scaled refrigeration units and without excessive energy consumption of refrigeration units.

It is a further object of this invention to provide a vacuum apparatus wherein a vapor condensing means installed in a vacuum chamber includes a means for passing through a refrigerant and a means for passing through a brine therewithin to thereby define a heat exchanger for both mediums, thereby eliminating the necessity of installing a heat exchanger for effecting the heat exchange between said refrigerant and brine individually outside of said vacuum chamber and constructing the apparatus as a whole in a compact manner omitting the space to be occupied by the installation of said heat exchanger.

It is still further object of this invention is to provide a vacuum apparatus capable of eliminating a refrigeration capability loss to be caused by the pump-energy-input wherein the coincidence between the place to be heated by condensation load of a vapor and the place to be cooled by a refrigerant is attained within a condensing means by the provision of a means for passing through a refrigerant and a means for passing through a brine and consequently the circulation of brine in a large flow rate is dispensed with which is indispensable in case where a heat exchanger between refrigerant and brine is installed individually outside of a vacuum chamber to thereby eliminate the loss in refrigeration capability caused by the heat coming from a large capacity pump, and additionally capable of reducing accidental losses extremely wherein even when the circulation of brine is lowered or stopped owing to a brine pump or the like accident the cooling action of the condensing means can be continued and further even when the brine circulation and refrigeration units are stopped simultaneously owing to a temporary power stoppage accident the rising of temperature of the condensing means can be suppressed and the vacuum state can be maintained longer than conventional vacuum apparatuses coping with a longer period of power stoppage.

It is still another object of this invention to provide a vacuum apparatus capable of cooling the condensing surface of a condensing means efficiently wherein the condensing means includes a refrigerant flow means and a brine flow means, the latter means being a space defined within the condenser, the former means being disposed within said space and including a portion closely adhered to the inner surface of the space, thereby permitting a direct heat exchange between either two mediums of three mediums comprising a refrigerant and a brine present within the condensing means and a vapor present outside thereof through a metallic boundary means partitioning said two mediums from each other.

It is yet another object of this invention to provide a vacuum apparatus wherein a heater is disposed for melting the ice frozen on the condensing surface of a condensing means, whereby the ice-melting action can be carried out efficiently.

It is still yet another object of this invention to provide a vacuum apparatus including a single vacuum chamber, a cooling and heating shelf means and condensing means disposed in said vacuum chamber and a vacuum pump connected to the vacuum chamber, said shelf means being supplied with a brine cooled by a refrigerant, wherein said condensing means defines a heat exchanger between said both mediums and between brine and/or refrigerant and vapor, and when heat exchange is performed between refrigerant and brine in a first step the space within said vacuum chamber is also cooled by the surface of the condensing means, thereby preventing the occurrence of heat loss inherent in a heat exchanger between refrigerant and brine installed individually in the outside.

It is still yet another object of this invention to provide a vacuum apparatus including a first vacuum chamber, a second chamber, said both chambers being connected through a duct with a valve, a shelf means disposed in said first vacuum chamber, a condensing means disposed in said second vacuum chamber, and a vacuum pump connected to the second vacuum chamber, said shelf means being supplied with a brine cooled by a refrigerant, wherein said condensing means defines a heat exchanger between said both mediums and between both or either one of these both mediums and vapor, and when heat exchange is performed between refrigerant and brine in a first step the valve of said duct is closed and said vacuum pump is driven for insulating the heat coming from outside, thereby preventing the occurrence of heat loss.

DETAILED DESCRIPTION OF THE INVENTION

Figure 3:
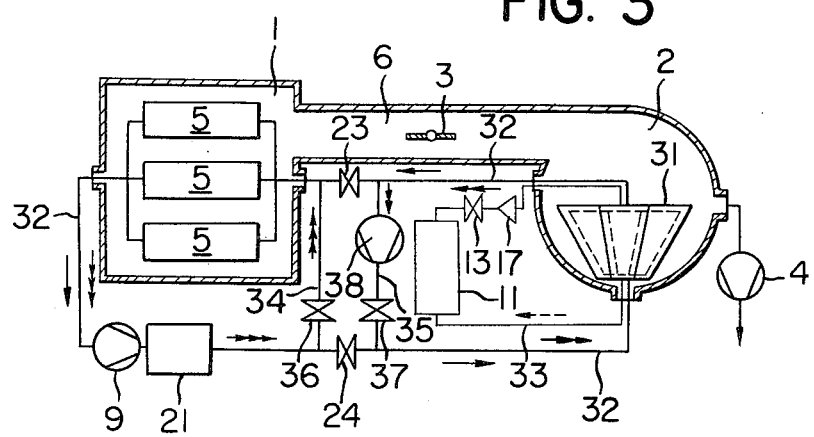
FIG. 3 is a partially cutaway diagrammatic explanatory general view of an embodiment of the vacuum apparatus according to this invention.

FIG. 3 and following illustrate embodiments of a vacuum apparatus according to this invention.

In this connection it is to be noted that the same reference numerals will be attached to the parts in those figures similar to those shown in FIG. 1 and FIG. 2 and explanation will be made mainly with reference to different parts different reference numerals hereinafter.

In FIG. 3, the vacuum apparatus according to this invention is not provided with the heat exchanger 7 installed individually outside of the vacuum chamber as seen in prior art vacuum apparatuses, wherein a condenser 31 is designed to fill the function of a heat exchanger.

And, to this condenser 31 is connected a brine pipe 32 through which a brine circulates between said pipe and a shelf 5 and a refrigerant pipe line 33 through which a refrigerant circulates between said pipe line and a refrigeration unit 11.

The brine pipe 32 is provided with brine pipes 34 and 35 extending before and behind valves 23 and 24 put between said pipes, a valve 36 and a valve 37 are disposed in these pipes 34 and 35 respectively, and further the brine pipe 35 is provided with a pump 38.

Figure 4:
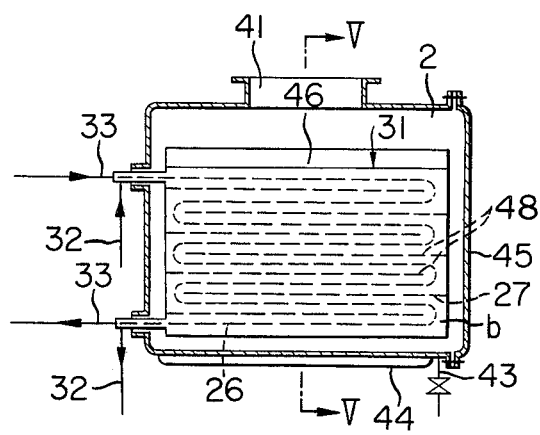
FIG. 4 is a longitudinal section front view of the second vacuum chamber of the vacuum apparatus illustrated in FIG. 3.

The particulars of the vacuum chamber 2 and condenser 31 are as shown in FIG. 4 and following.

Figure 5:
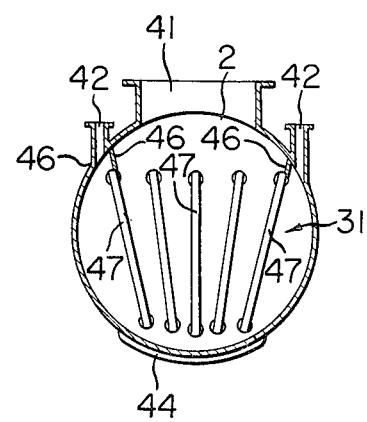
FIG. 5 is a view taken on line V—V of FIG. 4 and seen in the direction of the arrow.

In FIG. 4 and FIG. 5, reference numeral 41 denotes a vapor inlet disposed at the top where the vacuum chamber 2 is connected with a duct 6, on both sides of said vapor inlet are installed suction outlets 42 connected to a vacuum pump 4 respectively, at the bottom thereof are disposed a drain pipe 43 and a jacket heater 44, said heater 44 being arranged to be supplied with brine, hot water, steam and the like, and reference numeral 45 denotes a cover plate.

The condenser 31 comprises a plurality of vertical parallel condensing plates 47. The condensing plate 47, as is clearly seen especially from FIG. 4 and FIG. 6, has a continuous meandering space 49 with a condensing surface 51 whose inside is defined by a plurality of ribs 48 and whose inlet and outlet are connected with the brine pipe 32. And, within this space 49 is received a continuous meandering refrigerant pipe 50 whose inlet and outlet are connected with a refrigerant pipe line 33, and this pipe 50 is closely adhered to the inner wall of the space 49 by welding, pressing or the like.

Figure 6:
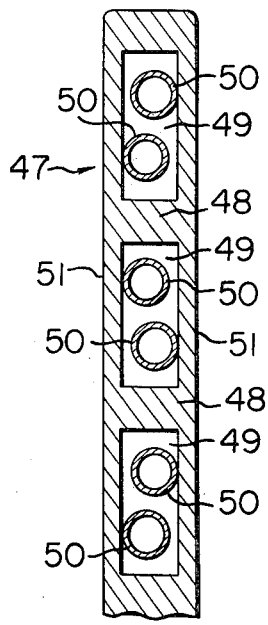
FIG. 6 is a partial longitudinal section side view of an embodiment of the condenser.

FIG. 6 illustrates an embodiment where two pipes are arranged. In FIG. 5, reference numeral 46 denotes a cutoff plate provided at the upper part of the outermost condensing plate 47 in order to prevent the direct suction of a vapor entering from the inlet 41 by the suction outlet 42.

Next, reference will be made as to the functions of aforesaid members,

Referring to FIG. 3, in the first step the valve 3 is closed, the vacuum pump 4 is driven, the valves 23 and 24 of the pipe line 32 are opened and the valves 36 and 37 of the brine pipes 34 and 35 are closed. Under these conditions, the refrigeration unit 11 is driven as well as the pump 9 is in action, thereby circulating the refrigerant through the pipe line 33 in the direction of the dotted arrow and the brine through the pipe line 33 in the direction of the one piece solid line arrow. And, at this time there takes place heat exchange between said refrigerant and brine within the condenser 47 so that the material being dried comes to be frozen at a predetermined temperature. The first step terminates at the time when said freezing has been completed.

In course of this step, heat exchange takes place between refrigerant and brine at the places such as the outer surface of the meandering refrigerant pipe 50 and the inner surface of the condensing plate 47 cooled by contacting with this refrigerant pipe 50.

Figure 9A:
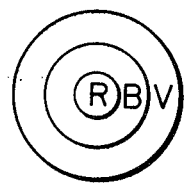
FIGS. 9(a)-(c) is an explanatory view illustrating the different heat exchange modes among the refrigerant, brine and vapor respectively.
Figure 9B:
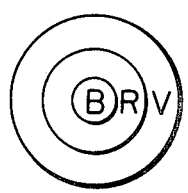
Figure 9C:
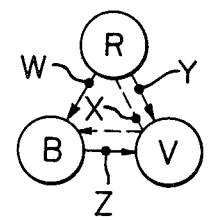
Figure 10:
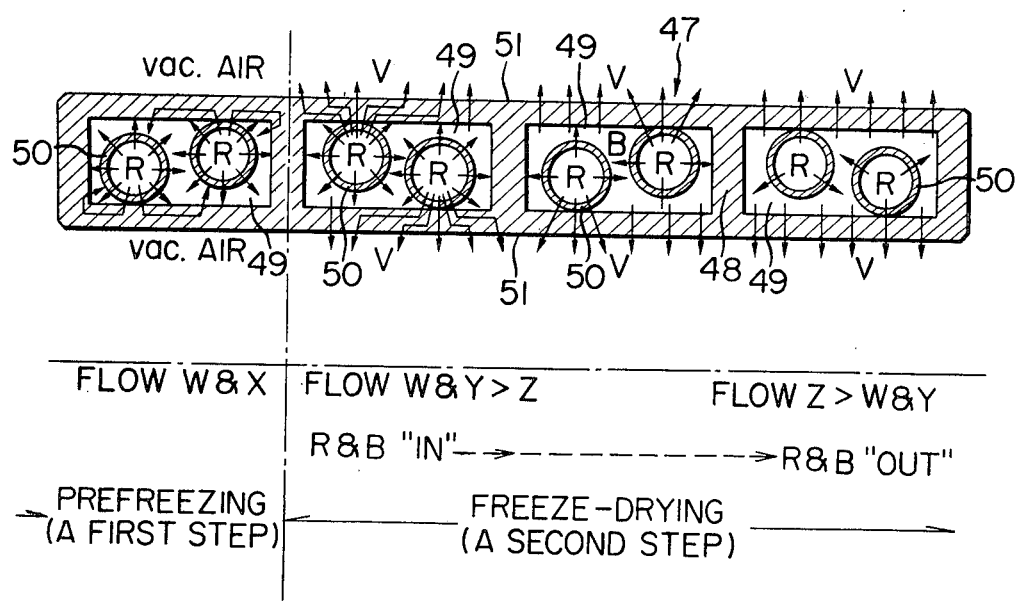
FIG. 10 is an explanatory view illustrating how the heat exchanger illustrated in FIG. 9 is actually carried out in the condenser.

FIGS. 9(a)-(c) three different modes of heat exchange among refrigerant R, brine B and vapor V as respectively. The arrow of channel at the left end in FIG. 10 indicates the aforesaid heat transfer manner. The direction of the arrow indicates the opposite direction of heat flow (the direction of negative heat flow). The vaccum chamber 2 is made vacuous by the action of the vacuum pump 4, and in this step free from condensation of vapor there takes place no negative heat loss from the outer surfaces 51 of the condensing plate 47 and consequently the condensing plate 47, as mentioned above, functions as a fin of the refrigerant pipe 50, thereby accelerating heat exchange between refrigerant and brine.

Subsequently, the switchover to the second step is effected. In this case either one of following two procedures may be selected depending on the conditions of the material being dried.

The first procedure is suitable for the case where the material being dried can be frozen completely at an especially low temperature. In this case, where the brine is still circulated within the pipe line 32 even after the first step has been completed and the vacuum pump 4 is also still in motion, the valve 3 is opened gradually under above conditions thereby making the vacuum chamber 1 vacuous. In case where the vacuum pump head was closed to stop the action of the vacuum pump after the vacuum chamber 2 had reached a predetermined vacuum pressure in the first step, the pump is driven again and the valve 3 is opened. After the vacuum chamber 1 has reached a predetermined vacuum pressure, valves 23 and 24 are closed, the valve 37 is opened, and the pump 38 is driven for circulating the brine through a part of the pipe line 32 and pipe 35 in the direction of the two piece solid line arrow and thus forming the flow of brine circulating through the condenser 31 so that the condenser 31 is further cooled up to a predetermined temperature. In view of the fact that the non-cooled brine to be mixed newly with the brine circulating in the condenser 31 is only that present within the pipe 35 and its heat capacity can be reduced to a low degree, for instance, such as 2% or less of the total heat capacity of circulating zones of the condenser 31 and pipe line 32, the rising of temperature of the condenser 31 at the time of switchover is negligible and further the load of shelf 5 is reduced from that of the refrigeration unit 11, whereby a predetermined temperature required for the condenser, for instance, −60° C. can be instantly obtained starting from the temperature at the end of the first step, for instance, −50° C.

When using this first procedure, it is made possible to place the shelf 5 and the material being dried under a predetermined vacuum pressure while continuing the cooling of them by means of the refrigeration unit 11, thereby removing the dangers such that the temperature of shelf 5 rises and the material being dried tends to melt during the switchover operation, in particular before reaching a predetermined vacuum pressure.

The second procedure for switchover to the second step is suitable for the case where the material being dried is frozen completely at a considerably high temperature and so the temperature of shelf 5 at the end of the first step is a considerably high temperature, for instance, such as −40° C. or higher. In this case, after the first step has been terminated, valves 23 and 24 are closed while closing the vacuum valve 3, valve 37 is opened and the pump 38 is in motion, then as in the first procedure, the brine is circulated through a part of the pipe line 32 and pipe 35 to thereby cool the condenser 31 up to a predetermined temperature, and successively the valve 3 is opened to make the vacuum chamber 1 vacuous. In case where the material being dried is difficult to melt, as there is no necessity of cooling the shelf 5 so much, the first step is terminated a little earlier than usual, only the condenser 31 is subjected to additional cooling up to a temperature sufficient for protecting the vacuum pump and thereafter the valve 3 is opened.

In any case of the first and second procedures, the valve 36 is opened simultaneously with the valve 37 while closing valves 23 and 24. Consequently, the other brine is circulated by the pump 9 in the direction of the three piece solid line arrow in the just same manner as in the apparatus illustrated in FIG. 2, and the vapor sublimed from within the material being dried is condensed and trapped by the condenser 31. Then, the switchover to the second step is effected.

Figure 1:
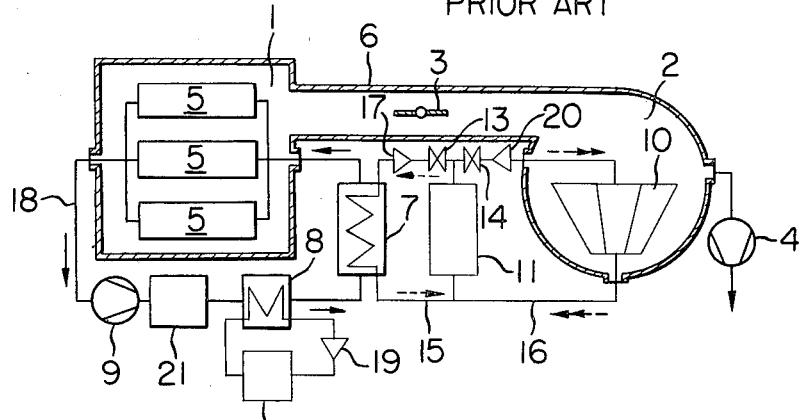
FIG. 1 is a partially cutaway diagrammatic explanatory general view of an embodiment of the prior art vacuum freeze drying apparatus.
Figure 2:
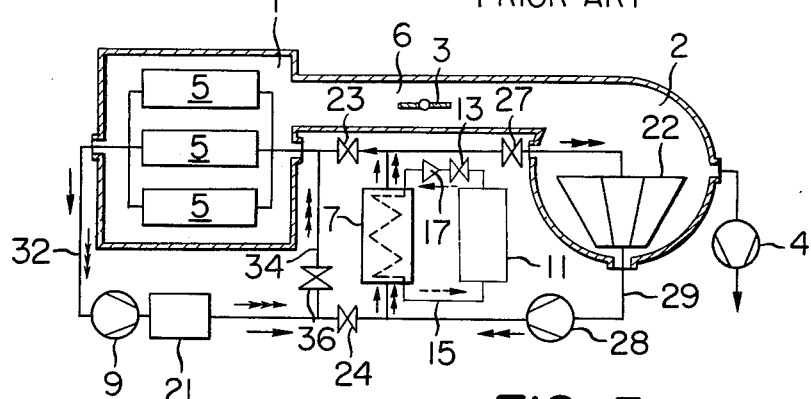
FIG. 2 is a partially cutaway diagrammatic explanatory general view of another embodiment of the prior art vacuum freeze drying apparatus.

As mentioned above, this apparatus acts as a heat exchanger for cooling the shelf 5 in the first step and diverts the part 31 having been cooled most deeply at the terminal of the first step, as it is or after subjecting to a slight additional cooling, to the part to be cooled most deeply in the second step, that is, condenser 31, and consequently can more stabilize the action of the refrigerating system by removing rapid load variations therefrom as compared with apparatuses as shown in FIG. 1 and FIG. 2, thereby achieving the economy of energy effectively. In other words, as in the case of the apparatus as illustrated in FIG. 1 the cooling energy of the heat exchanger 7 having been cooled most deeply at the finishing of the first step is not utilized, there is induced double waste such that the refrigerating system bears a burden of newly cooling the non-cooled condenser 10 in a hurry and further bears an additional burden of rising the temperature of the heat exchanger 7, the lowest-temperature body at the terminal of the first step, up to the same temperature as that of the shelf 5, the highest temperature body in the second step, by means of the heater 21. And, in the apparatus illustrated in FIG. 2, the cooling energy stored in the heat exchanger 7 is utilized for cooling the condenser 22, but the non-cooled condenser 22 is added as a load. Seen from the economical viewpoint of energy, furthermore, it may be added that as the members necessary to be cooled before the start of the second step, in addition to the shelf 5 and heater 21, the apparatus illustrated in FIG. 1 includes three members such as the first heat exchanger 7, second heat exchanger 8 and condenser 10, the apparatus illustrated in FIG. 2 includes two members such as the heat-exchanger 7 and condenser 22 and the apparatus according to this invention includes only one member, namely the condenser 31. In this connection it is to be noted that said condenser 31 naturally does not require the heat capacity more than those required by the heat exchangers 7 of the apparatuses illustrated in FIG. 1 and FIG. 2, because the condenser 31 does not include any additive being useless for heat exchange between refrigerant and brine. Accordingly, the apparatus according to this invention can reduce the heat capacity to be required for cooling prior to the start of the second step by for more than conventional apparatuses do.

In the second step, when the temperature of the shelf 5 suitable for the material being dried is comparatively low and is liable to rise from a predetermined valve owing to the heat from the energy of the circulating pump 9 and from the outside even when the heater 21 is off, this apparatus makes it possible to maintain the temperature of the shelf 5 at a predetermined valve in the manner of slightly opening valves 24 and 23 or additionally slightly closing the valve 36, in response to a shelf temperature signal, for mixing the high temperature brine circulating through the shelf 5 with the low temperature brine circulating through the condenser 31.

If there is necessity of controlling the temperature of the condenser 31 accurately, it can be achieved as follows. A thermostat is set to a desired temperature and this temperature signal is sent to valves 23 and 24 or the valve 36 in addition to said valves so that when the condenser is cooled below the set temperature the valves 23 and 24 are opened slightly and the valve 36 is closed slightly (or remains opened) to thereby mixing the brine on the high temperature side properly, and when the temperature of the condenser reaches the set temperature valves 23 and 24 are closed. At this time, the surplus refrigeration capability is cancelled by the heater 21, but it goes without saying that said surplus refirgeration capability may be utilized for other purposes by providing a brine tank in addition to the members illustrated in FIG. 3, connecting this tank to the pipe line 32 on the condenser side in parallel with the condenser and storing the surplus refrigeration capability in the brine tank.

In the second step, the vapor entering the vacuum chamber 2 from the vapor inlet 41 of the vacuum chamber 2 is condensed on the surface of the condensing plate 47. In three channels on the right side of FIG. 10 there are indicated the heat exchange relations among refrigerant, brine and vapor in the condenser 31 comprising the refrigerant inlet of the condenser 31 and the brine inlet of the condenser 31 as shown in FIG. 4 to the condensing plate 47 which has secured a direct heat exchange between refrigerant and vapor by adhering the refrigerant pipe 50 to the condensing plate 47. The temperature of brine at the inlet of the condenser 31 is higher than that at the outlet at least by the sum of the heat coming from the outside of the brine circulation pipe line and the fluid frictional heat generated from the inside. Referring to the state of refrigerant, on the other hand, it, extending from the inlet to the central part, is wet sufficient for achieving a superior heat transfer between refrigerant and vapor, but in the latter half where 70–75% or more of refrigerant has evaporated its coefficient of heat transfer deteriorates. Referring to the brine, then, its vapor trapping capability is higher at the vicinity of outlet of the condenser 31 than at the inlet thereof, while in the case of the refrigerant its capacity deteriorates in the vicinity of the outlet of the condenser 31. This opposite two tendencies permit the condenser 31 to have a uniform vapor trapping capability at its whole surface.

Thus, the vapor is condensed on the surface of the condensing plate 47 and descends while decreasing its flow rate, and further is condensed on the outer suface of the condensing plate 47 located on the both outer end. And, the vapor reaches the equilibrium vapor pressure of the condenser temperature at the suction outlet 42 and is discharged while excluding non-condensing gases to be mixed therewith such as air and the like.

After the whole steps have been completed, the valve 13 disposed in the refrigerant line is closed, a pump head valve (not shown) of the vacuum pump 4 is closed, valves 23 and 24 are opened again for circulating the brine into the loop of the brine pipe line including the shelf 5 and the condenser 31, valves 35 and 36 are closed and the pump 38 is stopped, whereby the brine on the higher temperature side comes to mix with that on the lower temperature side and thus an average temperature is attained. In case where the average temperature is lower than 0° C., it is raised more than 0° C. by means of the heater 21. During this operation, by continuing the running of the refrigeration unit 11 for a while the refrigerant still residing within the condenser is recovered by the refrigeration unit 11 and the ice layer deposited on the surface of the condenser 31 is separated and falls to the bottom. Hereat, when heating the ice using the jacket heater 44, a part of the ice melts and a part thereof is converted into a lower temperature vacuum vapor which acts to melt the condensed ice and separated ice. Thus, every ice can be melted rapidly without troubles of introducing any carriers such steam, water, hot wind and so forth from the outside of the vacuum chamber and is discharged from the drain.

Figure 7:
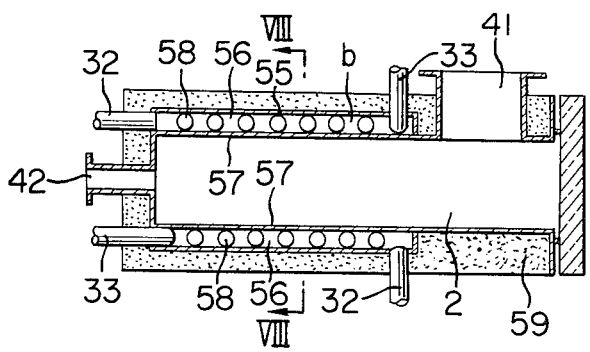
FIG. 7 is a partial longitudinal section side view of another embodiment of the second vacuum chamber of the vacuum apparatus according to this invention.
Figure 8:
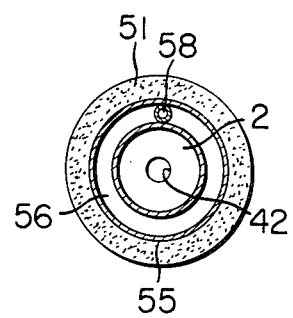
FIG. 8 is a view taken on line VIII—VIII of FIG. 7 and seen in the direction of the arrow.

In FIG. 7 and FIG. 8 there is illustrated another embodiment of the second vacuum chamber 2. In this connection it is to be noted that the same reference numerals will be attached to the parts similar to those illustrated in FIG. 4 through FIG. 6, and explanations will be made mainly with reference to different parts with different reference numerals.

This vacuum chamber 2 is cylinderical, a cylinder 55 is fitted on a part of the outer periphery of said chamber, a cylindrical space 56 is defined therebetween, the inner periphery thereof defines a condensing surface 57, and the brine pipe line 32 is connected to the inlet and outlet of this space 56 respectively. And, within this space 56 is included a spiral refrigerant pipe 58 which is designed to closely adhere to the inner periphery of said space as occasion demends, and the refrigerant pipe line 33 is connected to the inlet and outlet of the refrigerant pipe 58. And, the vacuum chamber 2 is wholly covered with an insulating material 59. The refrigerant pipe 58 may take a shape other than spiral.

This vacuum chamber 2 is profitably used for a small capacity of condenser, wherein a load adjusting heater may be installed at the outer periphery of a heat exchanger.

Although a particular preferred embodiment of the invention has been disclosed in detail for illustrative purposes, it will be recognized that variations or modifications of the disclosed apparatus, including the arrangement of parts, lie within the scope of the present invention.

Further, a vacuum chamber accommodating the shelf 5 and the material being dried may not be separated from a vacuum chamber in which the condensing surface is disposed. The shelf 5 and the condenser 31 may be disposed in a single vacuum chamber. In this case, it is impossible to prevent the occurrence of a heat loss in the manner of making the condenser 31 vacuous which is acting as a heat exchanger between refrigerant and brine in the first step. However, in view of the condenser 31 cooling the air within the same vacuum chamber as that in which the shelf 5 is disposed, said condenser may be said to promote the cooling of the shelf 5 and the freezing of the material being dried put on the shelf or between shelves, whereby there is caused no actual loss.

Still further, even when the refrigerant pipe 50 is not closely adhered to the inner surface of the condensing plate 47 in FIG. 6, it acts only to somewhat reduce the effect to be caused by directly cooling the condensing plate with the refrigerant pipe. Despite this, many objects intended by this invention can be achieved such as adjusting of condenser temperature, stability and easiness in the operation of refrigeration system, elusion of refrigeration capability loss owing to disuse of a large flow rate circulating pump and the like. This is also applicable to the case where the refrigerant pipe 58 is not closely adhered to the condensing surface 57 in FIG. 7.

Concerning the heat exchange relations illustrated in FIGS. 9(a)–9(c), generally speaking, the most effective relation 9(c) where a direct heat exchange is effected between either two mediums. However, since the levels of various capabilities required for vacuum apparatus are different individually, it is impossible under a fixed condition to remove the possibility of the selection of reduced processing cost of the condenser being more profitable than the effect to be obtained from close adhesion of the refrigerant pipe to the condensing plate.

It goes without saying that the aforesaid switchover of valves, operation of a pump and the like may be effected by the employment of suitable automatic controlling means, controlling circuit, etc. normally used in the apparatus of this type.

What is claimed is:

1. A vacuum apparatus comprising a chamber and a vacuum pump connected to the chamber for lowering the pressure in the chamber, a condenser positioned in said chamber, the condenser including a casing defining a space and having a metal outer plate whose exterior surface acts as a condensing surface, a refrigerant flow pipe positioned within a portion of the casing space and adhering to the interior surface of the metal outer plate, and means to pass brine through a remaining portion of said space within the casing.

2. The vacuum apparatus according to claim 1 wherein said condenser at least in part forms a chamber wall.

3. A vacuum apparatus according to claim 1 wherein a heater for melting the ice frozen by the condenser is installed within the chamber including said condenser therein.

4. A vacuum apparatus arranged such that cooling and heating shelf means and vapor condensing means are disposed within a vacuum chamber respectively, a vacuum pump is connected to the vacuum chamber and a brine cooled by a refrigerant which is supplied to said shelf means, wherein said vapor condensing means includes a metal outer plate whose front surface acts as a condensing surface and includes a refrigerant flow pipe and a brine flow space, said refrigerant flow pipe adhering to the back surface of said outer plate and within said vapor condensing means there takes place heat exchangers between both mediums and between both or either one of both mediums present therewithin and a vapor present outside thereof.

5. A vacuum apparatus arranged such that a first vacuum chamber is connected with a second vacuum chamber through a duct with a valve disposed therein, said first vacuum chamber is provided with cooling and heating shelf means and said second vacuum chamber is provided with vapor condensing means respectively, a vacuum pump is connected to the second vacuum chamber, and a brine cooled by a refrigerant is supplied to said shelf means, wherein said condensing means includes a metal outer plate whose front surface acts as a condensing surface and includes a refrigerant flow pipe adhering to the back surface of the outer plate and within said condensing means there takes place heat exchangers between said both mediums and between both or either one of both mediums and between both or either one of both mediums present therewithin and a vapor present outside thereof.

6. A vacuum apparatus according to claim 4 or 5 wherein said condenser comprises a plurality of panel-like casings, each of which includes a space and a metal outer plate whose front surface acts as a condensing surface, a refrigerant flow pipe is disposed in said space while adhering to the back surface of the outer plate, and the remaining space is used for a brine passage.

7. A vacuum apparatus according to claim 4 or 5 wherein said condenser has a space defined between a double wall surrounding a part of the vacuum chamber, the inner wall body of said double wall is formed of a metal plate whose front surface acts as a condensing surface, said inner wall body defining the vacuum chamber, a refrigerant flow pipe is disposed in the space defined between the double wall while adhering to the back surface of said inner wall body, and the remaining space is used for a brine passage.

8. A vacuum apparatus according to claim 4 or 5 wherein a heater for melting the ice frozen by the condenser is installed within the vacuum chamber including said condenser therein.

* * * * *

UNITED STATES PATENT AND TRADEMARK OFFICE
CERTIFICATE OF CORRECTION

PATENT NO. : 4,353,222
DATED : October 12, 1982
INVENTOR(S) : Masakazu Kobayashi It is certified that error appears in the above—identified patent and that said Letters Patent is hereby corrected as shown below:

Column 1, line 7, insert a comma (,) after "cooling".

Column 2, line 48, change "of" to -- to --.

Column 3, lines 30 and 31, change "beings" to -- brings --.

Column 4, line 46, change "sublimited" to -- sublimated --.

Column 6, line 28, delete "is" (second occurrence).

Column 9, line 3, before "three" insert -- illustrate --;
         line 4, delete "as".

Column 10, line 64, change "for" to -- far --.

Column 11, line 22, change "refirgeration" to -- refrigeration --.

Column 12, line 35, change "demends" to -- demands --.

Column 13, line 12, after "relation" insert -- is --.

UNITED STATES PATENT AND TRADEMARK OFFICE
CERTIFICATE OF CORRECTION

PATENT NO. : 4,353,222
DATED : October 12, 1982
INVENTOR(S) : Masakazu Kobayashi It is certified that error appears in the above—identified patent and that said Letters Patent is hereby corrected as shown below:

Column 14, line 6, change "exchangers" to -- exchanges --;
line 22, change "exchangers" to -- exchanges --;
lines 23 and 24, delete "and between both or either one of both mediums".

Signed and Sealed this

Eighth Day of March 1983

[SEAL]

Attest:

Attesting Officer

GERALD J. MOSSINGHOFF
Commissioner of Patents and Trademarks